United States Patent [19]

Bacskai

[11] 4,139,525

[45] Feb. 13, 1979

[54] FLEXIBLE GLYCOLIC ACID TERPOLYMERS

[75] Inventor: Robert Bacskai, Kensington, Calif.

[73] Assignee: Chevron Research Company, San Francisco, Calif.

[21] Appl. No.: 826,491

[22] Filed: Aug. 22, 1977

[51] Int. Cl.$^2$ .............................................. C08G 63/60
[52] U.S. Cl. ................................... 528/302; 260/860; 560/84; 560/90; 560/185
[58] Field of Search .......................... 560/90, 185, 84, 260 76; 75 R; 77; 340.6; 78.3 R

[56] References Cited

U.S. PATENT DOCUMENTS

| | | | |
|---|---|---|---|
| 2,585,427 | 2/1952 | Beck | 260/78.3 R |
| 2,676,945 | 4/1954 | Higgins | 260/78.3 R X |
| 2,683,136 | 7/1954 | Higgins | 260/78.3 R |
| 2,831,832 | 4/1958 | Caldwell | 260/76 |

*Primary Examiner*—Lucille M. Phynes
*Attorney, Agent, or Firm*—D. A. Newell; John Stoner, Jr.; A. T. Bertolli

[57] ABSTRACT

Flexible glycolic acid terpolymers useful in the preparation of hot-melt adhesives are prepared by heating glycolic acid, its esters, its homopolymers or mixtures thereof with a dihydroxyalkane and a dibasic acid.

11 Claims, No Drawings

FLEXIBLE GLYCOLIC ACID TERPOLYMERS

BACKGROUND OF THE INVENTION

This invention concerns glycolic acid terpolymers with a dihydroxyalkane and a dibasic acid. The terpolymers have been found to have improved flexibility, lower melting points, and excellent adhesive properties.

Glycolic acid polymerization is described in U.S. Pat. No. 2,676,945. According to this patent, the polycondensation is carried out in the solid state by heating glycolic acid at 218° C. and 0.5 mm pressure.

U.S. Pat. No. 2,585,427 describes melt polymerization of glycolic acid at 197°–245° C. and 0.3–0.5 mm pressure using an antimony catalyst.

Polyglycolic acid, or "polyglycolide", as it is sometimes called, has a variety of uses. In particular, being soluble in physiological fluids, it has been used as an absorbable suturing material. To enhance or alter the physical properties of polyglycolide, numerous glycolic acid polyester copolymers have been suggested. For example, polyglycolide has been copolymerized with low-molecular-weight lactones such as beta-propiolactone to form heat-stable copolymers. British Pat. No. 695,823 describes moldable, high-tensile-strength polymeric organosilicons prepared by copolymerization of alkyl and aryl dialkoxyhalosilane mixtures with glycolic acid or polyglycolide. Belgian Pat. No. 584,365 describes flexible film-forming copolymers prepared by heating glycolic acid with a maleic anhydride-vinyl acetate copolymer. U.S. Pat. No. 2,916,468 describes textiles treated with a copolymer of polyglycolic acid and a polyalkylene glycol such as polyethylene glycol or methoxypolyethylene glycol.

Polybasic acids and polyhydric alcohols have been copolymerized to form polyesters often referred to as "alkyd resins". When both the acid and alcohol are bifunctional, the polyester is a linear copolymer. In general, the linear polyesters of a dibasic acid and a diol are microcrystalline powders. In the molten state they are usually quite viscous. Many of these copolymers are described in *Advanced Chemistry*, Vol. I, Gilman (ed.), John Wiley and Sons, Inc.

SUMMARY OF THE INVENTION

It has been found that glycolic acid, its low-molecular-weight esters, its homopolymers, or mixtures thereof, can be heated with a dibasic acid and a dihydroxyalkane to form flexible terpolymers having a lower melting point than the corresponding glycolic acid homopolymer and having good adhesive properties. It has also been found that the flexibility of the terpolymers can be improved by including small amounts of polyol in the system forming a slightly cross-linked or branched polymer.

DETAILED DESCRIPTION OF THE INVENTION

Among other factors, the present invention is based upon the discovery that glycolic acid, its esters, and its homopolymers will form terpolymers with dibasic acids and dihydroxyalkanes rather than mixtures of copolymers, as might be expected, and that the terpolymers can be modified by including small amounts of polyol to form flexible film-forming polymers.

Glycolic acid, also referred to in the literature as hydroxyacetic acid, can be commercially obtained or can be synthesized by the acid-catalyzed carbonylation of formaldehyde. U.S. Pat. No. 3,911,003 describes the carbonylation of aqueous formaldehyde using a hydrogen fluoride catalyst.

The homopolymers of glycolic acid, also referred to as "glycolide" or "polyglycolides", are commercially available or can be synthesized by heating glycolic acid. For example, the cyclic glycolide dimer can be obtained by pyrolytic dehydration of glycolic acid as described in U.S. Pat. No. 2,668,162. The polyglycolides, having a linear structure represented by the formula

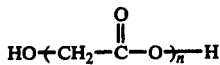

can be obtained by conventional ring-opening polymerization of glycolide or by direct polycondensation of glycolic acid. U.S. Pat. No. 2,676,945 and U.S. Pat. No. 2,585,427 describe the direct polycondensation of glycolic acid.

Low molecular weight esters of glycolic acid can be prepared by conventional acid-catalyzed carboxylic acid/alcohol esterification. Accordingly, suitable glycolic acid esters have the formula:

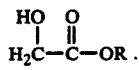

wherein R is an alkyl group containing from 1 to about 4 carbon atoms.

The terpolymers of this invention are prepared by heating glycolic acid, its low-molecular-weight esters, its homopolymers, or mixtures thereof with both a dibasic acid and a dihydroxyalkane. Suitable dibasic acids include both aliphatic and aromatic low-molecular-weight diacids. Preferred aliphatic diacids include the straight- or branched-chain diacids containing from 2 to about 14 carbon atoms. Preferred aromatic diacids include aralkyl and alkaryl diacids having from 6 to about 14 carbon atoms. Thus, suitable preferred diacids are represented by the formula

wherein R is $C_2$–$C_{12}$ alkylene, $C_6$–$C_{12}$ arylene or a $C_2$–$C_{12}$ oxaalkylene. Diacids can be obtained by several methods. For example, diacids can be synthesized by the oxidation of xylenes or alpha-omega glycols, hydrolysis of dinitriles, or electrolysis of salts of acid esters. These and other methods of synthesis are well known and are thoroughly described in *The Chemistry of Organic Compounds*, 3rd, Noller (ed.), W. B. Saunders Co.

Suitable dihydroxyalkanes include both aliphatic and aromatic low-molecular-weight diols. Preferred diols contain from 2 to 14 carbon atoms. Thus, suitable preferred diols are represented by the formula

wherein x is greater than 1, preferably 2 to about 14, and $R^1$ is $C_2$–$C_{12}$ alkyl or $C_6$–$C_{10}$ aryl. Suitable diols can be prepared by conventional methods, such as hydrolysis of the corresponding dihalide or reduction of the corresponding diester or diacid.

Specific representative diacids and diols include diacids such as ethanedioic acid (oxalic acid), propanedioic acid (malonic acid), butanedioic acid (succinic acid), hexanedioc acid (adipic acid), pentanedioc acid (glutaric acid), pimelic acid, suberic acid, azelaic acid, sebacic acid, terephthalic acid, isophthalic acid, naphthalene-1,5-dicarboxylic acid, diglycolic acid, and the like; and diols such as the 1,2- and 1,3-glycols, e.g., ethylene glycol, diethylene glycol, propane-1,2-diol, 1,4-dimethylolcyclohexane, and the like.

The terpolymerization is carried out under polycondensation conditions. Preferably the monomers are heated to a temperature of from about 150° to about 260° C. and a pressure of from about 2 atmospheres to 0.001 mm. The polymerization is fairly rapid, but is temperature-dependent. Thus, polymerization can be carried out at temperatures as low as 120° C. At temperatures above about 270° C., decomposition losses are more likely. Accordingly, a temperature of from about 120° C. to about 270° C. is acceptable, and a narrower range of from about 200° C. to about 250° C. is preferred. At a temperature of about 220° C., nearly quantitative yields were obtained in about 2 hours.

The glycolic terpolymers of this invention vary widely in composition. They may contain as little as about 1% by weight of the diacid or as much as about 40%. Similarly, they may contain from about 1 to about 40% by weight of the dihydroxyalkane. Preferably the diacid and dihydroxyalkane are present in equimolar quantities. However, for low acid number terpolymers, i.e., a preponderance of the terpolymerization product being terpolymers terminated by hydroxyl groups, an excess of the dihydroxyalkane relative to dibasic acid should be used, for example, up to about 10 mol percent excess in the product. Because some low molecular weight glycol is lost due to volatilization during polymerization, the charge to the reaction vessel may have as much as 30% excess of glycol to compensate for this loss. In general, as the diacid and dihydroxyalkane content is increased the flexibility of the resultant terpolymer also increases. The terpolymers typically have a molecular weight between about 2000 and 70,000. As the reaction time and temperature are increased, molecular weight also increases. Typical terpolymers favor the structure amounts of polyols having more than two hydroxyl groups are used in addition to a major amount of dihydroxy alkane. For the purposes of this invention, from about 2 to about 2.2 equivalents of total hydroxyl groups are preferably employed per mol of dibasic acid. The total number of equivalents of hydroxyl groups is determined by multiplying the number of hydroxyl groups in a molecule by the number of mols of that hydroxyl-containing compound present and summing up for all hydroxyl-containing compounds in the feedstock. For example, a 20/80 molar mixture of trihydroxyalkane/dihydroxyalkane would have:

$$20 \times 3 + 80 \times 2 = 60 + 160 = 220 \text{ equivalents}$$

of hydroxy and would require from 100 to 110 mols of a dicarboxylic acid, i.e., 200 to 220 equivalents of carboxyl groups.

When polyols having more than two hydroxyl groups are utilized in the present invention, care must be taken in the processing to present excess cross-linking. Excess cross-linking leads to an insoluble, inflexible product. Therefore, during processing, the temperature and time of reaction must be carefully controlled. At high temperatures shorter times are needed to reach the desired conversion. Control is maintained by observing the viscosity of the reaction mixture, and stopping the reaction when this mixture reaches the desired viscosity.

Polyols which are useful to modify the terpolymers of this invention include both aliphatic and aromatic polyols. However, the aliphatic triols and tetraols are preferred, particularly those containing from about 5 to 15 carbon atoms. For example, 1,1,1-trimethylol ethane and pentaerythritol are especially preferred polyols.

The polymers which are formed by polycondensation of glycolic acid, its homopolymer, esters, or mixtures thereof with a dibasic acid, a dihydroxyalkane, and a polyol are slightly cross-linked or branched through the polyol unit of the polymer which increases the molecular weight of the polymer and improves flexibility.

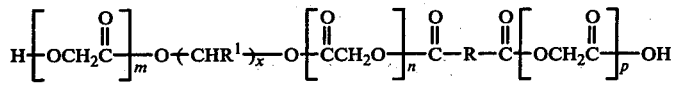

wherein R, R$^1$ and x are as defined previously and m, n and p are determined by the conditions of polymerization and relative monomer concentrations. Thus, the polyester condensation terpolymers will typically have a block structure which could generally be called a polyglycolic acid randomly interspersed by dihydroxyalkane or dibasic acid moieties. Other structures are also possible.

In another embodiment of the present invention, the terpolymers can be modified to provide high molecular weight, slightly cross-linked or branched flexible polymers by substituting a minor amount of polyol for dihydroalkane. Thus, in a preferred embodiment, minor The polymers of this invention are particularly useful as biodegradable hot-melt adhesives and flexible films. They can also be used as plasticizers, slow-release agents for pesticides, flame retardants, and fibers for disposable non-woven fabrics.

The following examples further illustrate polymers of the invention and suggest alternative embodiments.

EXAMPLES

In each of the following examples, commercially obtained pure glycolic acid was heated with adipic acid and ethylene glycol. Table I summarizes the results.

TABLE I

| | Glycolic Acid Terpolymers | | | | | | | |
|---|---|---|---|---|---|---|---|---|
| Ex. No. | Glycolic Acid, grams | Adipic Acid, grams | Ethylene Glycol, grams | Temp. °C | Time, hrs. | Pressure, mm Hg | Terpolymer | |
| | | | | | | | Molecular Weight | Melting Point° C |
| 1 | 7.22 | 0.73 | 0.34 | 218 | 1 | 760 | 1000 | 162–167 |
| | | | | 218 | 1 | 120 | | |
| 2 | 7.22 | 0.73 | 0.34 | 218 | 1 | 760 | 4500 | 161–166 |
| | | | | 218 | 1 | 120 | | |
| | | | | 218 | 1 | 0.3 | | |

TABLE I-continued

| | Glycolic Acid Terpolymers | | | | | | Terpolymer | |
|---|---|---|---|---|---|---|---|---|
| Ex. No. | Glycolic Acid, grams | Adipic Acid, grams | Ethylene Glycol, grams | Temp. °C | Time, hrs. | Pressure, mm Hg | Molecular Weight | Melting Point° C |
| 3 | 7.22 | 0.73 | 0.34 | 218 | 1 | 760 | 9000 | 175-177 |
| | | | | 218 | 1 | 120 | | |
| | | | | 218 | 1 | 0.3 | | |
| | | | | 245 | 1 | 0.3 | | |

In the following examples, polyglycolide obtained by pyrolitic dehydration of glycolic acid was heated with a mixture of adipic acid and ethylene glycol. The results are summarized in Table II.

TABLE II

| | Polyglycolide Terpolymer | | | | | Terpolymer | |
|---|---|---|---|---|---|---|---|---|
| Ex. No. | Poly-glycolide, grams | Adipic Acid, grams | Glycol, grams | Temp. °C | Pressure, mm hg | Time, hrs. | Molecular Weight | Melting Point, °C |
| 4 | 5.51 | 0.73 | 0.34 | 218 | 760 | 1 | 3000 | 152-158 |
| | | | | 218 | 120 | 1 | | |
| | | | | 218 | 0.3 | 1 | | |
| 5 | 5.51 | 0.73 | 0.34 | 218 | 760 | 1 | 4500 | 150-155 |
| | | | | 218 | 120 | 1 | | |
| | | | | 218 | 0.3 | 1 | | |
| | | | | 245 | 0.3 | 1 | | |

Examples 1–5 illustrate that as the temperature and time of polymerization are increased the molecular weight of the resulting terpolymer also increases. The terpolymers are substantially soluble in dimethylsulfoxide and show good adhesion, particularly to paper.

In the following examples commercially obtained pure glycolic acid was heated with adipic acid, ethylene glycol, and 1,1,1-trimethylol ethane. Table III summarizes the conditions of polymerization and properties of the polymers.

TABLE III

| | Cross-Linked Glycolic Acid Terpolymers | | | | | | |
|---|---|---|---|---|---|---|---|
| Ex. No. | Glycolic Acid (grams) | Adipic Acid (grams) | Ethylene Glycol (grams) | Tri-methylol Ethane (grams) | Final Temp. °C | MW $(10^{-3})$ | M.P. (°C) |
| 6 | 7.42 | 0.37 | 0.14 | 0.042 | $218^2$ | 18 | 191-3 |
| 7 | 7.22 | 0.73 | 0.28 | 0.084 | $218^2$ | 10 | 162-6 |
| 8 | 7.42 | 0.37 | 0.14 | 0.042 | $245^3$ | 33 | 180-90 |
| 9 | 7.22 | 0.73 | 0 | 0.40 | $245^3$ | $-1$ | $-1$ |
| 10 | 7.22 | 0.73 | 0.28 | 0.084 | $245^3$ | 10 | 159-63 |
| 11 | 7.22 | 0.73 | 0.31 | 0.04 | $245^3$ | 49 | 157 |
| 12 | 6.84 | 1.46 | 0.56 | 0.168 | $245^3$ | 20 | 92-110 |

[1]Insoluble; did not melt; too much cross-linking.
[2]Reaction conditions as in Example 4.
[3]Reaction conditions as in Example 5.

In the following examples commercially obtained glycolic acid was heated with adipic acid, ethylene glycol, and pentaerythritol. Table IV summarizes the conditions of polymerization and the properties of the polymers.

TABLE IV

| | Cross-Linked Glycolic Acid Polymers | | | | | | |
|---|---|---|---|---|---|---|---|
| Ex. No. | Glycolic Acid (grams) | Adipic Acid (grams) | Ethylene Glycol (grams) | Pentaery-thritol (grams) | Final Temp. °C | MW | M.P. °C |
| 12 | 7.22 | 0.730 | 0.28 | 0.068 | $218^2$ | 19,000 | 164-167 |
| 13 | 7.22 | 0.73 | 0.28 | 0.068 | $245^3$ | $-1$ | $-1$ |
| 14 | 7.22 | 0.73 | 0.31 | 0.034 | $245^3$ | 55,000 | 210-220 |

[1]Insoluble, did not melt, too much cross-linking.
[2]Reaction conditions as in Example 4.
[3]Reaction conditions as in Example 5.

The polymers of this invention have a variety of uses. For example, they are useful in the manufacture of non-woven fabric and flexible films, as slow-release carriers for pesticides, as flame-retardants, and hot-melt adhesives. Since they are biodegradable, they are particularly useful in the manufacture of disposable products. In addition, their relative flexibility, film-forming As suggested by the examples tabulated in Table III, satisfactory glycolic acid polymers may comprise from about 98% to about 85%, by weight, of glycolic acid, and from about 2% to about 15%, by weight, of adipic acid, ethylene glycol and 1,1,1-trimethylol ethane or pentaerythritol, the molar amount of adipic acid being equivalent to the combined molar amounts of ethylene glycol and the trimethylol or pentaerythritol, and the molar ratio of the ethylene glycol to the trimethylol ethane or pentaerythritol being from about 10:1 to 5:1.

properties, good adhesiveness to a variety of substances (especially paper) and thermal stability ideally suit them for use as hot-melt compositions.

Although the polymer functions satisfactorily by itself, hot-melt compositions typically comprise a polymer, a tackifying resin, and a viscosity modifying agent such as wax, as well as fillers, stabilizers, antioxidants, and the like. The polymer will generally comprise from about 10% to about 100%, by weight of the composition.

What is claimed is:

1. A polymer useful as a hot-melt adhesive produced by heating a mixture of glycolic acid, its homopolymers, its low-molecular-weight esters, or mixtures thereof, with a dihydroxyalkane and a dibasic acid, the dibasic acid being present in an amount from about .1% to about 40% by weight of the polymer, and the dihydroxyalkane being present in an amount from about equimolar with, up to a 10-mol percent excess over, the dibasic acid, said heating being carried out at a temperature from about 120° C. to about 270° C. for a period of time sufficient to produce a polymer having a molecular weight between about 2,000 and 70,000.

2. A polymer useful as a hot-melt adhesive produced by heating a mixture of glycolic acid, its homopolymers, its low-molecular-weight esters, or mixtures thereof, with a dihydroxyalkane and a dibasic acid, the dibasic acid being present in an amount from about 1% to about 40% by weight of the polymer, and the dihydroxyalkane being present in an amount from about equimolar with, up to a 10-mol percent excess over, the dibasic acid, the dihydroxyalkane being selected from diols having 2 to 14 carbon atoms, and the dibasic acid being selected from the group consisting of aliphatic diacids having 2 to 14 carbon atoms and the aromatic diacids having 6 to 12 carbon atoms, said heating being carried out at a temperature from about 120° C. to about 270° C. for a period of time sufficient to produce a polymer having a molecular weight between about 2,000 and 70,000.

3. A polymer useful as a hot-melt adhesive produced by heating a mixture of glycolide with a dihydroxyalkane and a dibasic acid, the dibasic acid being present in an amount from about 1% to about 40% by weight of the polymer, and the dihydroxyalkane being present in an amount from about equimolar with, up to a 10-mol percent excess over, the dibasic acid, said heating being carried out at a temperature from about 120° C. to about 270° C. for a period of time sufficient to produce a polymer having a molecular weight between about 2,000 and 70,000.

4. A polymer useful as a hot-melt adhesive produced by heating a mixture of glycolic acid, its homopolymers, its low-molecular-weight esters, or mixtures thereof, with a dihydroxyalkane and in an amount of from about 1% the about 40% by weight of the polymer of a dibasic acid selected from the group consisting of ethanedioic acid, propanedioic acid, butanedioic acid, hexanedioic acid, pentanedioic acid, pimelic acid, suberic acid, azelaic acid, diglycolic acid, and sebacic acid, the dihydroxyalkane being present in an amount from about equimolar with, up to a 10-mol percent excess over, the dibasic acid, said heating being carried out to a temperature from about 120° C. to about 270° C. for a period of time sufficient to produce a polymer having a molecular weight between about 2,000 and 70,000.

5. A polymer useful as a hot-melt adhesive produced by heating a mixture of glycolic acid, its homopolymers, its low-molecular-weight esters, or mixtures thereof, with a dihydroxyalkane and in an amount of from about 1% the about 40% by weight of the polymer of a dibasic acid selected from the group consisting of ethanedioic acid, propanedioic acid, butanedioic acid, hexanedioic acid, pentanedioic acid, pimelic acid, suberic acid, azelaic acid, diglycolic acid, and sebacic acid, the dihydroxyalkane being present in an amount from about equimolar with, up to a 10-mol percent excess over, the dibasic acid, and being selected from the group consisting of 1,2-glycols and 1,3-glycols, said heating being carried out at a temperature from about 120° C. to about 270° C. for a period of time sufficient to produce a polymer having a molecular weight between about 2,000 and 70,000.

6. A polymer useful as a hot-melt adhesive produced by heating a mixture of glycolic acid, its homopolymers, its low-molecular-weight esters, or mixtures thereof, with a dihydroxyalkane and adipic acid, the adipic acid being present in an amount from about 1% to about 40% by weight of the polymer, and the dihydroxyalkane being present in an amount from about equimolar with, up to a 10-mol percent excess over, the adipic acid, said heating being carried out at a temperature from about 120° C. to about 270° C. for a period of time sufficient to produce a polymer having a molecular weight between about 2,000 and 70,000.

7. A polymer useful as a hot-melt adhesive produced by heating a mixture of glycolic acid, its homopolymers, its low-molecular-weight esters, or mixtures thereof, with (a) a dihydroxyalkane, (b) a minor amount relative to the dihydroxyalkane of a polyol having more than two hydroxyl groups, and (c) a dibasic acid, the dibasic acid being present in an amount from about 1% to about 40% by weight of the polymer, and the dihydroxyalkane being present in an amount from about equimolar with, up to a 10-mol percent excess over, the dibasic acid, the dihydroxyalkane and said polyol combined providing from about 2 to 2.2 equivalents of total hydroxyl group per mol of dibasic acid, said heating being carried out at a temperature from about 120° C. to about 270° C. for a period of time sufficient to produce a polymer having a molecular weight between about 2,000 and 70,000.

8. A polymer useful as a hot-melt adhesive produced by heating a mixture of glycolic acid, its homopolymers, its low-molecular-weight esters, or mixtures thereof, with (a) a dihydroxyalkane, (b) a minor amount relative to the dihydroxyalkane of a polyol selected from the group consisting of aliphatic triols and tetraols having from about 5 to about 15 carbon atoms, and (c) a dibasic acid, the dibasic acid being present in an amount from about 1% to about 40% by weight of the polymer, and the dihydroxyalkane being present in an amount from about equimolar with, up to a 10-mol percent excess over, the dibasic acid, the dihydroxyalkane and said polyol combined providing from about 2 to 2.2 equivalents of total hydroxyl group per mol of dibasic acid, said heating being carried out at a temperature from about 120° C. to about 270° C. for a period of time sufficient to produce a polymer having a molecular weight between about 2,000 and 70,000.

9. A polymer useful as a hot-melt adhesive produced by heating a mixture of glycolic acid, its homopolymers, its low-molecular-weight esters, or mixtures thereof, with (a) a dihydroxyalkane, (b) a minor amount relative to the dihydroxyalkane, of 1,1,1-trimethylolethane or pentaerythritol, and (c) a dibasic acid, the dibasic acid being present in an amount from about 1% to about 40% by weight of the polymer, and the dihydroxyalkane being present in an amount from about equimolar with, up to a 10-mol percent excess over, the dibasic acid, the dihydroxyalkane and said polyol combined providing from about 2 to 2.2 equivalents of total hydroxyl group per mol of dibasic acid, said heating being carried out at a temperature from about 120° C. to about 270° C. for a period of time sufficient to produce a polymer having a molecular weight between about 2,000 and 70,000.

10. A glycolic acid polymer comprising from about 98% to about 85% by weight of glycolic acid, and from about 2% to about 15% by weight of adipic acid, ethylene glycol, and 1,1,1-trimethylol ethane wherein the molar amount of said adipitc acid is equivalent to the combined molar amounts of said glycol and said trimethylol ethane and the molar ratio of said glycol to said trimethylol ethane is from about 10:1 to about 5:1.

11. A polymer comprising from about 98% to about 85%, by weight, of glycolic acid, and from about 2% to about 15% by weight of adipic acid, ethylene glycol and pentaerythritol wherein the molar amounts of the adipic acid is equivalent to the combined molar amounts of the glycol and the pentaerythritol, and the molar ratio of the glycol to the pentaerythritol is from about 10:1 to about 5:1.

* * * * *

UNITED STATES PATENT AND TRADEMARK OFFICE
CERTIFICATE OF CORRECTION

PATENT NO. : 4,139,525
DATED : February 13, 1979
INVENTOR(S) : Robert Bacskai

It is certified that error appears in the above—identified patent and that said Letters Patent are hereby corrected as shown below:

Column 7, line 29, "6 to 12" should read --8 to 14--.

Column 7, line 49, "the" (first occurrence) should read --to--.

Column 7, line 57, "to" (first occurrence) should read --at--.

Column 7, line 65, "the" (first occurrence) should read --to--.

Column 9, line 10, "adipitc" should read --adipic--.

Signed and Sealed this

Nineteenth Day of June 1979

[SEAL]

Attest:

RUTH C. MASON
Attesting Officer

DONALD W. BANNER
Commissioner of Patents and Trademarks